Nov. 9, 1937.  R. T. OSMAN  2,098,670

DUMP BODY

Filed April 8, 1936

INVENTOR
RALPH T. OSMAN
BY

ATTORNEYS

Patented Nov. 9, 1937

2,098,670

UNITED STATES PATENT OFFICE 2,098,670

DUMP BODY

Ralph T. Osman, Milwaukee, Wis.

Application April 8, 1936, Serial No. 73,296

2 Claims. (Cl. 298—24)

This invention appertains to dump wagons, trailers, etc., and more particularly to a novel body construction for such vehicles.

It is customary to provide heavy channel beams or like structural units for the body portions of dump trailers and wagons. This renders the vehicles heavy and hard to manipulate and materially adds to their difficulty of manufacture and cost. Further, the channel beams and other brace units fail to give the body the desired rigidity and strength.

Therefore, one of the primary objects of my present invention is to provide novel means for forming the body, whereby the same is of a unitary construction eliminating the use of channel beams and the like.

Another salient object of my invention is to provide a mono-plate box-type welded body for dump vehicles, whereby a rigid and strong construction will be had with the elimination of distortion and weave on uneven grade.

A further important object of my invention is to provide novel means for folding the plates of the body so that the desired strength will be had at the bottom of the body, and whereby the folded portions will form an adequate support for the side strengthening ribs.

A still further object of my invention is the provision of a novel arch construction for the bottom doors, whereby a simple, strong and durable construction will be had, and whereby the quick dumping of the load is assured.

With these and other objects in view, the invention consists in the novel construction, arrangement and formation of parts, as will be hereinafter more specifically described, claimed and illustrated in the accompanying drawing, in which drawing:

Figure 1:
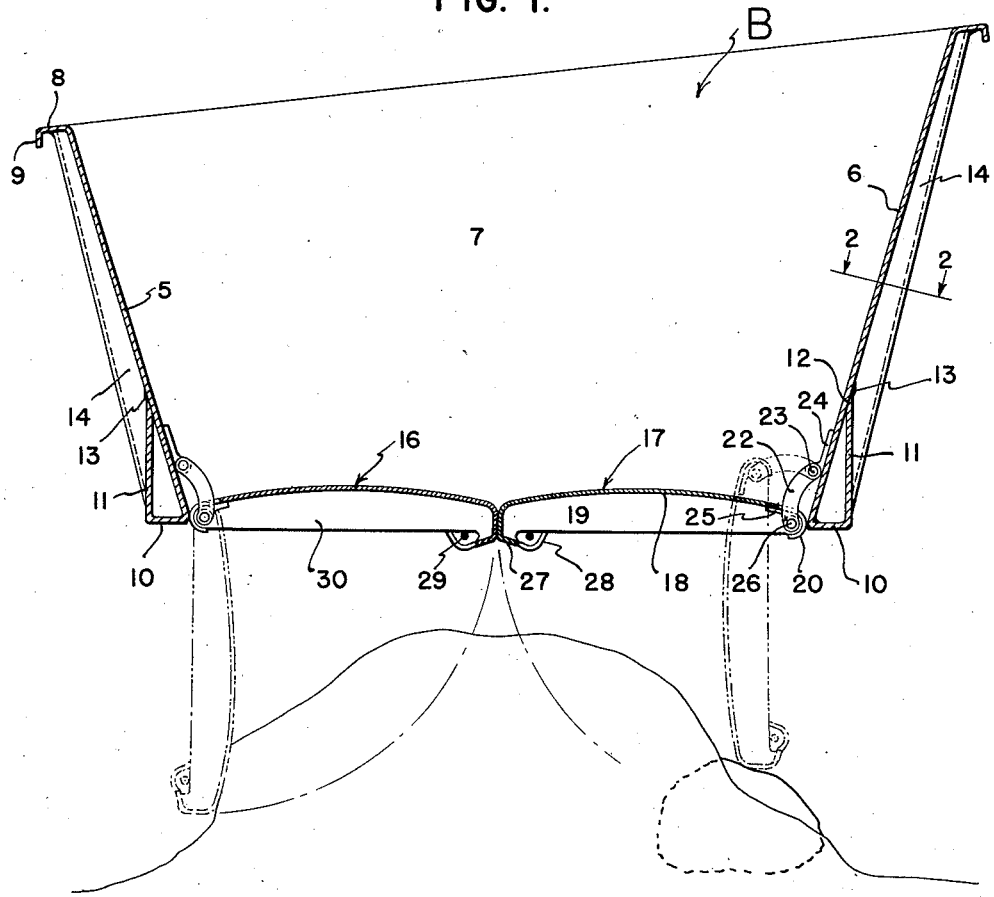
Figure 1 is a central transverse section through my improved dump body.

Referring to the drawing in detail, wherein similar reference characters designate corresponding parts throughout the several views, the letter B generally indicates my improved dump body. As brought out in the objects of the specification, it is one of the salient features of the invention to provide an all-welded unitary body so that a strong and durable construction will be had without danger of the breaking away of any of the parts of the body incident to the travel of the vehicle over rough and uneven grade.

The body B includes the side plates 5 and 6, which preferably incline downwardly and inwardly. These side plates are formed from steel of the desired gauge and are firmly welded to the end plates 7. The top edges of all of the plates are bent laterally at right angles, as at 8, and then downwardly to provide a depending flange or skirt 9. The portions 8 and 9 form a reinforcing rim around the entire upper edge of the body and eliminate the necessity of providing angle irons and the like.

One of the main features of the invention is the provision of novel means for forming the bottom of the side plates 5 and 6, whereby to give the desired strength to the body without the use of channel beams and the like. Thus, the lower ends of the side plates 5 and 6 are bent outwardly and laterally in a horizontal plane to form bottom wall portions 10.

The terminals of the bottom wall portions 10 are then bent at right angles to provide upstanding, longitudinally extending, external, side reinforcing plates 11. These plate portions 11 are extended upwardly until the same abut the outer faces of the side plates 5 and 6, and it is preferred to have the upper edges of the strengthening plate portions 11 beveled as at 12 to conform to the inclination of the side plates 5 and 6. These edges are then firmly welded, as at 13, to the side plates 5 and 6. This provides a strong and durable body of extremely light weight.

Figure 2:
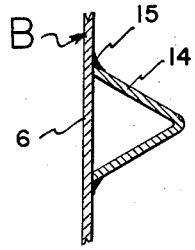
Figure 2 is a detail, fragmentary, horizontal sectional view taken substantially on the line 2—2 of Figure 1, illustrating the means of incorporating the strengthening ribs with the side walls of the body.
Figure 3:
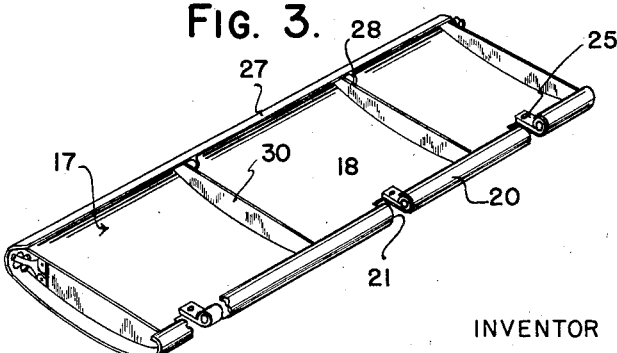
Figure 3 is a detail perspective view of one of the improved dump doors looking from the bottom thereof.

In order to further add to the rigidity of the body, I provide, at spaced points, upright, V-shaped reinforcing ribs 14. These ribs extend from the top body rim 8 to the reinforcing side plate portions 11, and the terminals of the ribs 14 are shaped to snugly abut and engage the inner face of the rim, the outer faces of the side plates 5 and 6, and the side plate portions 11. These ribs are firmly welded in place, as indicated by the reference character 15 in Figure 2.

By this arrangement and construction I provide an all-welded mono-plate box-type construction, which will effectively withstand extremely hard usage without the addition of unnecessary weight.

As also brought out in the objects, another salient feature of the invention is the novel construction of the bottom dump doors 16 and 17. These doors 16 and 17 are also formed from metal plates of the desired gauge and are of an all-welded construction. The doors are of a hollow arch form, and I lay particular stress upon this shape.

As illustrated, the dump doors 16 and 17 each include an arcuate body plate portion 18 having its longitudinal edges curved downwardly and inwardly to provide depending flanges 19 and 20. The arcuate flange 20, at spaced points, is slotted, as at 21, to receive the hinge links 22. These links are pivoted at their upper ends on pivot pins 23 carried by brackets 24 firmly held to the inner faces of the side plates 5 and 6.

The inner faces of the plates 18 of the doors at one side of the slots have welded or otherwise secured hereto hinge barrels 25, and hinge pins 26 extend through the lower ends of the links and into the hinge barrels. It is to be noted that the barrels are received within the arcuate flange 20, and thus these barrels form a reinforcement for the flanges.

The flanges 19 of the doors are adapted to abut when the doors are in their closed position, and the lower edges of the flanges 19 have formed thereon the inwardly extending guard flanges 27. These flanges 27 have formed thereon or welded thereto guard loops 28 for receiving the pull cables 29, which are employed for closing the doors. The loops 28 are welded to strengthening plates 30, which extend across the inner faces of the doors 16 and 17 at spaced points. The reinforcing plates 30 extend under the flanges 19 and 20 and are firmly welded to the flanges and the inner faces of the plates 18 forming a part of the doors.

The arch construction of the doors forms a strong and sturdy construction, and at the same time assures the quick dumping of the load when the doors are swung open. Due to the fact that I employ links for hingedly connecting the doors in place, the doors can raise and lower to conform to uneven ground conditions, and further the links facilitate the closing of the doors, should material cling to the inner edges of the doors.

From the foregoing description it can be seen that I have provided an all-welded body for dump trucks, which will possess extremely light weight with strength and rigidity.

Changes in details may be made without departing from the spirit or the scope of my invention, but what I claim as new is:

1. A side wall plate for dump vehicles comprising, an inclined body portion, a laterally extending flange formed on the upper edge of the body portion, a laterally and outwardly extending horizontal bottom wall portion formed on the lower edge of the body portion, an upwardly and vertically extending reinforcing plate portion formed on said bottom wall portion, said reinforcing wall portion having its upper edge extending into abutting relation with the outer surface of the body portion, said edge being welded to the outer surface of the body portion, and reinforcing ribs welded to said body portion, said ribs being extended into intimate abutting engagement with the top flange and the side reinforcing plate portions.

2. A side wall plate for dump vehicles comprising, an inclined body portion, a laterally extending flange formed on the upper edge of the body portion, a laterally and outwardly extending horizontal bottom wall portion formed on the lower edge of the body portion, an upwardly and vertically extending reinforcing plate portion formed on said bottom wall portion, said reinforcing wall portion having its upper edge extending into abutting relation with the outer surface of the body portion, said edge being welded to the outer surface of the body portion, and reinforcing ribs welded to said body portion, said ribs being extended into intimate abutting engagement with the top flange and the side reinforcing plate portions, the ends of the ribs being shaped to conform to the configuration of the top flange and said reinforcing plate portion and welded thereto.

RALPH T. OSMAN.